United States Patent
Diep et al.

(10) Patent No.: US 9,944,239 B1
(45) Date of Patent: Apr. 17, 2018

(54) FLUID AND DUST RESISTANT SPLIT GROMMET

(71) Applicant: Newfrey LLC, New Britain, CT (US)

(72) Inventors: Tien T. Diep, West Bloomfield, MI (US); Jason A. Meyers, Shelby Township, MI (US); Gerard J. Kmita, Allen Park, MI (US); Kei Akazawa, Tochigi (JP)

(73) Assignee: Newfrey LLC, New Britain, CT (US)

( * ) Notice: Subject to any disclaimer, the term of this patent is extended or adjusted under 35 U.S.C. 154(b) by 0 days.

(21) Appl. No.: 15/600,159

(22) Filed: May 19, 2017

(51) Int. Cl.
*B60R 16/02* (2006.01)
*H02G 3/22* (2006.01)

(52) U.S. Cl.
CPC ...... *B60R 16/0222* (2013.01); *B60R 16/0215* (2013.01); *H02G 3/22* (2013.01); *Y10T 16/063* (2015.01)

(58) Field of Classification Search
CPC .. B60R 16/0222; B60R 16/0215; H02G 3/22; Y10T 16/063
USPC ........................................ 174/152 G, 153 G
See application file for complete search history.

(56) References Cited

U.S. PATENT DOCUMENTS

| | | | |
|---|---|---|---|
| 4,784,285 A | 11/1988 | Patel | |
| 4,912,287 A | 3/1990 | Ono et al. | |
| 5,545,854 A | 8/1996 | Ishida | |
| 5,639,993 A | 6/1997 | Ideno et al. | |
| 5,659,924 A | 8/1997 | Gildersleeve | |
| 6,010,134 A | 1/2000 | Katoh | |
| 6,218,625 B1 | 4/2001 | Pulaski | |
| 6,627,817 B1 | 9/2003 | Kortenbach | |
| 6,660,937 B1 | 12/2003 | MacLeod et al. | |
| 7,481,436 B2 | 1/2009 | May et al. | |
| 7,915,534 B2 | 3/2011 | Uchibori et al. | |
| 8,375,513 B2 * | 2/2013 | Okuhara | B60R 16/0222 16/2.1 |
| 8,544,147 B2 | 10/2013 | Paku et al. | |

(Continued)

FOREIGN PATENT DOCUMENTS

EP 1004480 B1 5/2006
EP 1710882 B1 10/2006

(Continued)

*Primary Examiner* — Dhirubhai R Patel
(74) *Attorney, Agent, or Firm* — Harness, Dickey & Pierce, PLC

(57) ABSTRACT

A grommet assembly to support a wiring harness passing through an opening in a panel, the assembly including two rotationally symmetrical components coupled together along a primary coupling face to form a harness-receiving passage therethrough. Each rotationally symmetrical component including a first, thermoplastic structural portion integrated with a second, resilient sealing portion. The structural portions including a plurality of interlocking elements cooperating to couple the components together, and a plurality of retention arms engageable against the panel to retain the assembly and panel together. The sealing portion forming an outer sealing lip having a lip distal edge engageable against a surface of the panel adjacent the opening. The outer sealing lip including lap joints adjacent opposite sides of the primary coupling face. The structural portions including reinforcement tabs extending over each lap joint and designed to resist separation of the lap joints.

20 Claims, 10 Drawing Sheets

(56) References Cited

U.S. PATENT DOCUMENTS

| | | | |
|---|---|---|---|
| 9,024,195 B2 * | 5/2015 | Clothier | H02G 3/0691 16/2.1 |
| 9,096,185 B2 | 8/2015 | Fujita et al. | |
| 9,315,163 B2 | 4/2016 | Nagayasu | |
| 9,365,170 B2 | 6/2016 | Gronowicz, Jr. et al. | |
| 2014/0060922 A1 | 3/2014 | Weyrich et al. | |

FOREIGN PATENT DOCUMENTS

| | | |
|---|---|---|
| EP | 2677615 A2 | 12/2013 |
| WO | WO2012111179 A1 | 8/2012 |
| WO | WO2012111180 A1 | 8/2012 |
| WO | WO2015145003 A1 | 10/2015 |

* cited by examiner

US 9,944,239 B1

FLUID AND DUST RESISTANT SPLIT GROMMET

FIELD

The present disclosure relates to a grommet assembly for supporting wiring harnesses passing through an opening in a panel.

BACKGROUND

This section provides background information related to the present disclosure which is not necessarily prior art.

Grommets are used to support the passage of wiring harnesses and bundles through openings in a panel or other member. For example, grommets have a variety of important applications in the automotive industry, including for mounting in a through-hole of a vehicle body panel. Traditionally, grommets comprise one piece that must be installed or fed from one end of the wire harness or bundle and moved towards the designated opening and requires lubrication. This process is costly because it is labor intensive and time consuming, particularly when the wires are long.

Another option is to assemble grommet halves, together in place around the wires. In many cases, however, it is important to seal the grommet with the panel to mitigate against water, dust, dirt, or other contaminants passing therebetween. Unfortunately, using such assembled grommet halves creates difficulties in obtaining adequate grommet-to-panel sealing, in addition to adequate grommet half-to-half sealing and grommet-to-wire sealing. One or more separate, independent sealing members can be assembled together with the grommet halves to provide the necessary sealing, but this is also labor intensive and time consuming, and prone to errors that can compromise the assembly or seal.

SUMMARY

This section provides a general summary of the disclosure, and is not a comprehensive disclosure of its full scope or all of its features.

In various aspects of the present disclosure, a grommet assembly supports a wiring harness passing through an opening in a panel. The grommet assembly includes two rotationally symmetrical components coupled together along a primary coupling face to form a harness-receiving passage therethrough. Each rotationally symmetrical component comprises a first, thermoplastic structural portion integrated with a second, resilient sealing portion. The structural portions of the integrated components include a plurality of interlocking elements and a plurality of retention arms. The interlocking elements cooperate to couple the rotationally symmetrical components together. The retention arms are engageable against the panel to retain the grommet assembly and the panel together. The sealing portions of the integrated components include an outer sealing lip having a lip distal edge engageable against a surface of the panel adjacent the opening. The outer sealing lip further comprises lap joints that are adjacent opposite sides of the primary coupling face. The structural portions of the integrated components include outer reinforcement tabs that extend over each lap joint. The outer reinforcement tabs are designed to resist separation of the lap joints of the outer sealing lip of the sealing portion.

In other aspects of the present disclosure, a grommet assembly supports a wiring harness passing through an opening in a panel. The grommet assembly includes two rotationally symmetrical components coupled together along a primary coupling face to form a harness-receiving passage therethrough. Each rotationally symmetrical component comprises a first, thermoplastic structural portion integrated with a second, resilient sealing portion. The structural portions of the integrated components include a plurality of interlocking elements and a plurality of retention arms. The interlocking elements cooperate to couple the rotationally symmetrical components together. The retention arms are engageable against the panel to retain the grommet assembly and the panel together. The sealing portions of the integrated components include an outer sealing lip and an inner sealing lip. The outer sealing lip comprises an outer lip distal edge engageable against a surface of the panel adjacent the opening, and the inner sealing lip comprises an inner lop distal edge engageable against a side edge of the opening of the panel. The outer sealing lip further includes lap joints adjacent opposite sides of the primary coupling faces.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
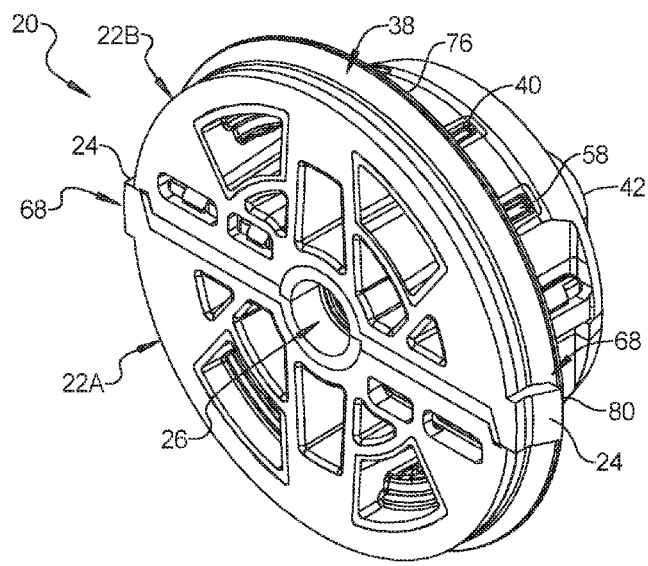
FIGS. 1A and 1B are perspective views of one exemplary grommet assembly in accordance with the present disclosure comprising two coupled rotationally symmetrical components each having a first, thermoplastic structural portion and a second, resilient sealing portion.

Example embodiments will now be described more fully with reference to the accompanying drawings.

FIGS. 1A-8B illustrate various aspects of one exemplary embodiment of a two-piece or split grommet assembly 20 in accordance with the present disclosure. The grommet assembly 20 can support a wiring harness 96, including any bundle or group of wires, passing through an opening 94 in a panel 18 (see FIGS. 4 and 5). The grommet assembly 20 can include two rotationally symmetrical components 22A, 22B that can be coupled together along a primary coupling face or sealing joint 52 (see FIGS. 3B and 4) by a plurality of interlocking elements or members 98 (see FIG. 6), which can include interlocking surfaces or detents 48 and 50, such as those provided by interlocking or extending tabs 44 and receiving pockets or cavities 46, respectively, in the illustrated embodiments.

Figure 9:
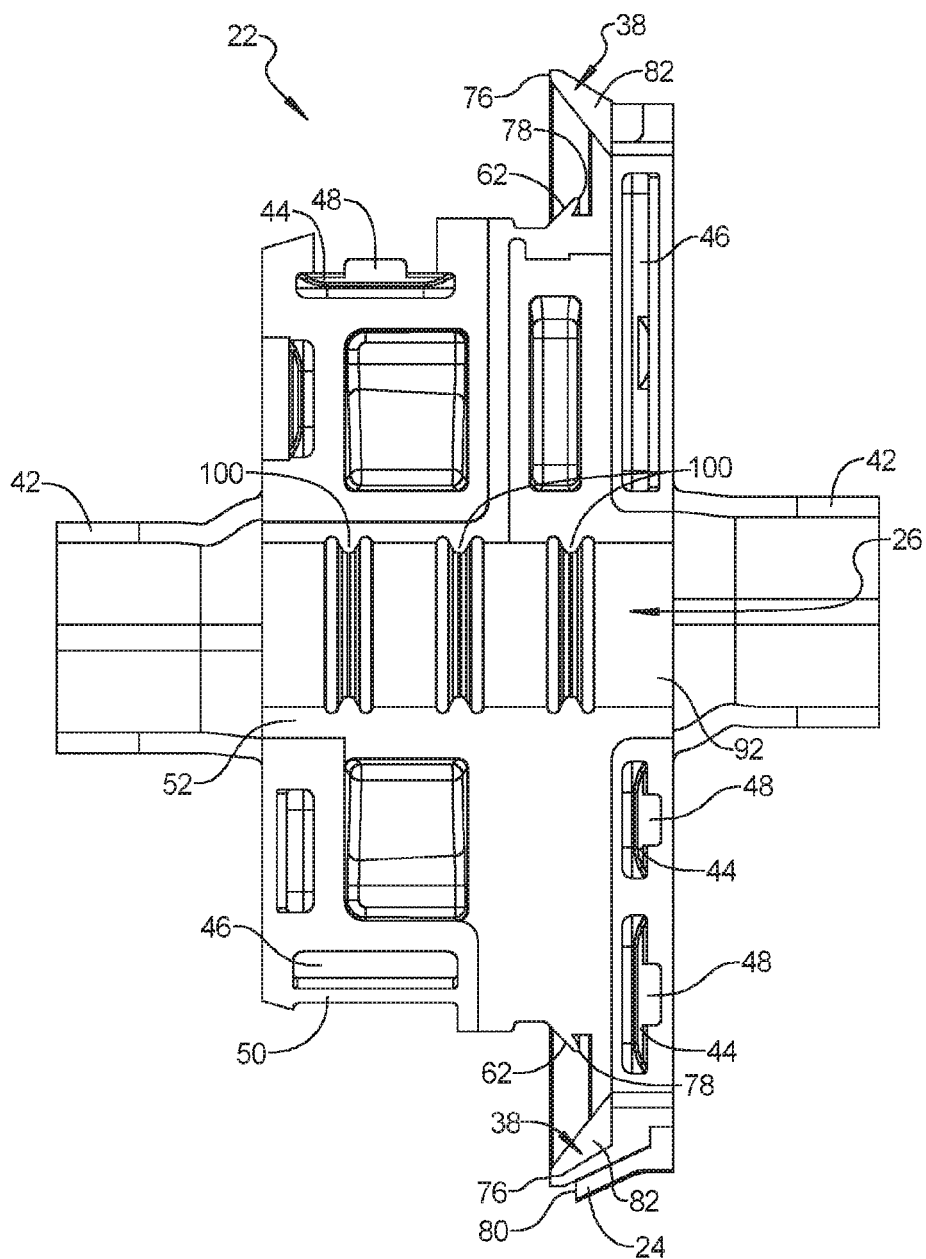
FIG. 9 is a side elevation view of another exemplary rotationally symmetrical component of a grommet assembly that is similar to that of FIGS. 1A-8B, but including additional extended wiring passages and supports extending on both sides of a corresponding exemplary grommet assembly.

The grommet assembly 20 includes a harness-receiving passage or center cavity 26 therethrough. The assembly 20 can include an annular collar extension 42 that can form a distal or end portion of the harness-receiving passage 26 to provide additional support to the wiring harness or bundle 96 passing therethrough. The collar extension 42 can comprise lap joints 74 for additional stability and support. In some embodiments, as seen in FIG. 9, a collar extension 42 can be provided on both, opposite sides of the grommet assembly 20 so that both distal ends of the harness-receiving passage 26 are formed by one of the collar extensions 42.

Figure 2A:
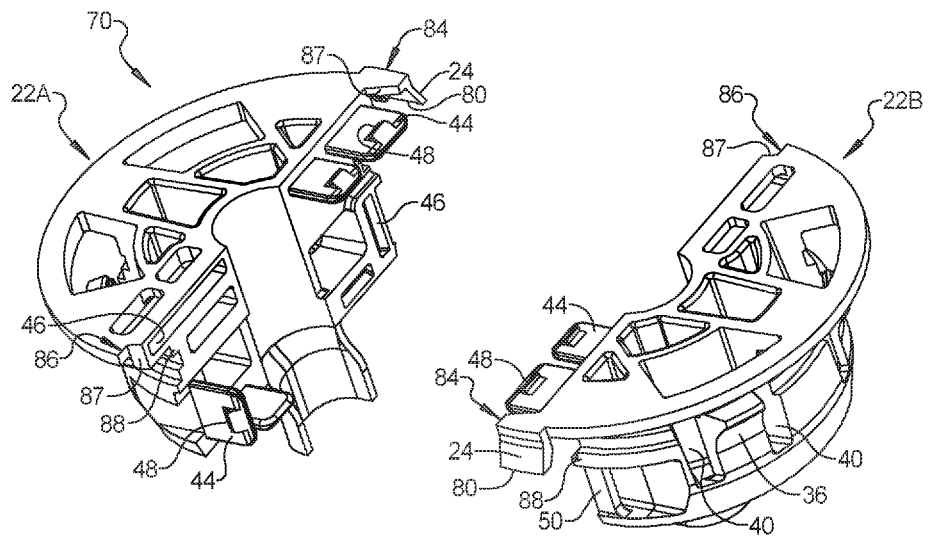
FIG. 2A is an exploded perspective view of the structural portions of the rotationally symmetrical components of FIGS. 1A and 1B.
Figure 2B:
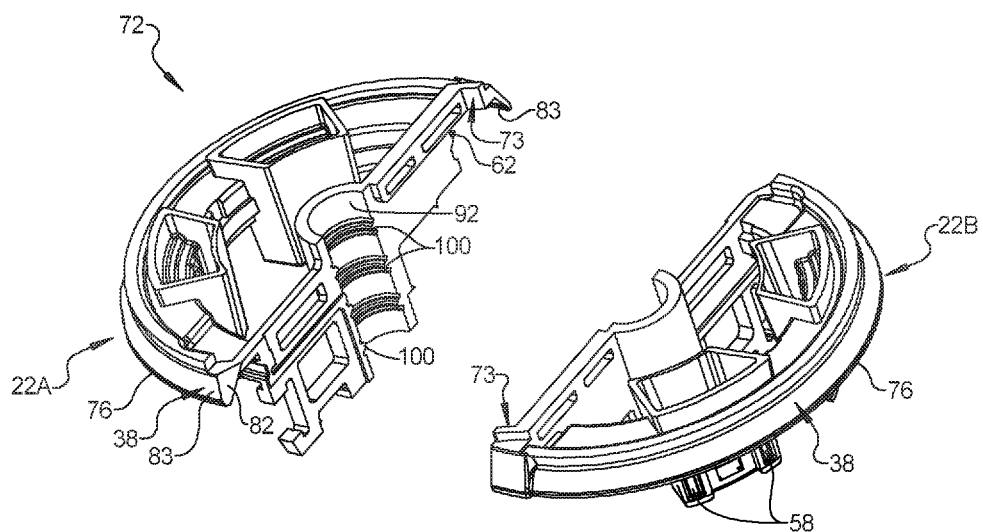
FIG. 2B is an exploded perspective view of the sealing portions of the rotationally symmetrical components of FIGS. 1A and 1B.
Figure 3A:
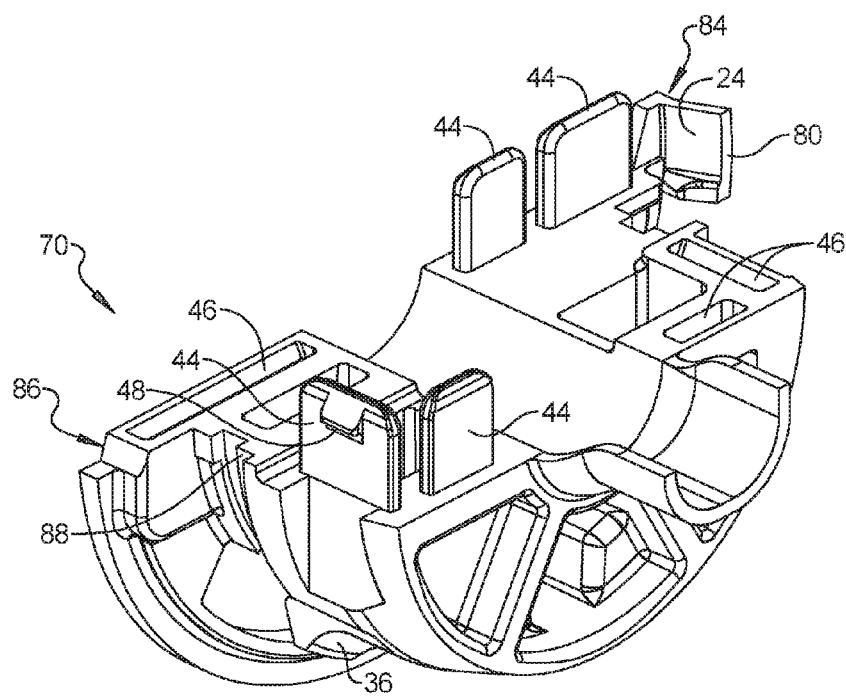
FIG. 3A is a perspective view of the structural portion of one of the rotationally symmetrical components of FIGS. 1A and 1B.
Figure 3B:
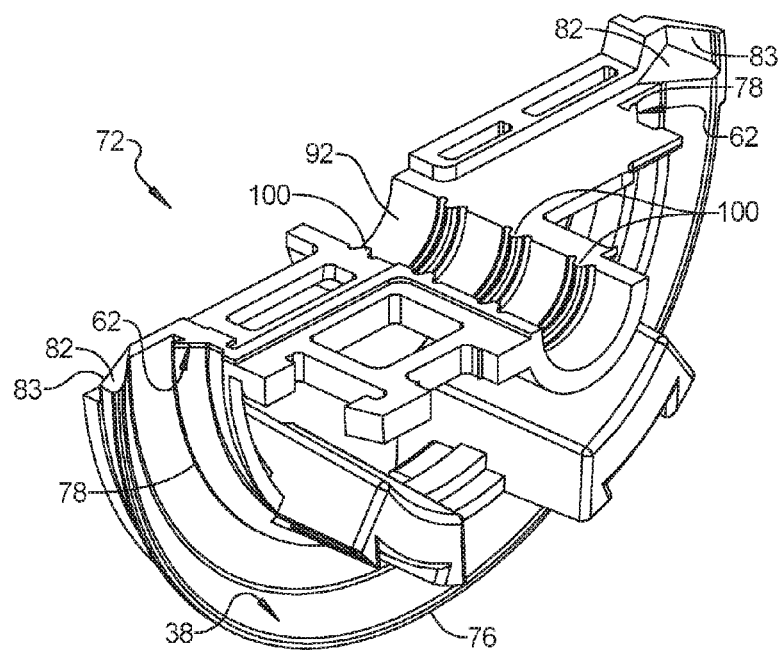
FIG. 3B is a perspective view of the sealing portion of one of the rotationally symmetrical components of FIGS. 1A and 1B.

Each rotationally symmetrical component 22A and 22B can include a first or rigid, thermoplastic structural member or portion 70 that is integrated with (including coupled or otherwise joined together) a second, resilient sealing member or portion 72. The structural and sealing portions 70, 72 can be integrated with each other along substantially all contacting surfaces thereof or via only along selected portions of contacting surfaces thereof. FIGS. 2A and 3A illustrate the structural portions 70 of the rotationally symmetrical components 22A and 22B, while FIGS. 2B and 3B illustrate the resilient portions 72 of the rotationally symmetrical components 22A and 22B. In some instances, the sealing portion 72 comprises a thermoplastic elastomer ("TPE") material having Durometers from about 25 to about 80. In some instances, the sealing portion 72 comprises a thermoplastic elastomer ("TPE") material having a Durometer of from about 25 to about 40. In some instances, the sealing portion 72 comprises a thermoplastic elastomer ("TPE") material having a Durometer of about 30.

As seen in FIGS. 2A and 3A, the structural portions 70 can include a plurality of interlocking elements or members 98 in the form of interlocking or coupling tabs 44 and pockets or cavities 46. In the illustrated embodiment, the coupling tabs 44 extend forwardly from the primary coupling face 52 of each rotationally symmetrical component 22A and 22B, with the tab receiving or coupling cavities or pockets 46 formed therein. The primary coupling face 52 can include staggered parallel surfaces. The staggered parallel surfaces can result from portions of the sealing portion 72 extending over or overlapping the structural portion 70, as seen in FIG. 8B. When coupled the extending tabs 44 of the first integrated component 22A are received by the receiving pockets 46 of the second integrated component 22B, and the receiving pockets 46 of the first integrated component 22A receive the extending tabs 44 of the second integrated component 22B. The extending tabs 44 can include exterior facing surfaces or detents 48 received by cooperating surfaces or detents 50 within the receiving pockets 46.

In a variety of instances, the structural portions 70 can include fewer or additional extending tabs 44 and corresponding receiving pockets 46. Further, the extending tabs 44 and corresponding receiving pockets 46 can take a variety of forms. As seen in the illustrated examples, the structural portions 70 can each include a plurality of extending tabs 44 and/or detents 48 whose major dimension extends in a first direction (e.g., vertical in FIGS. 4, 5, and 9) and one or more extending tabs 44 and/or detents 48, with the major dimension of each extending in a second direction (e.g., horizontal FIGS. 4, 5, and 9) that is perpendicular to the first direction. The same can be true regarding the orientation of the major dimension of the pockets 46 and/or detents 50.

The structural portions 70 of the integrated components 22A and 22B can include a plurality of retention arms or snaps 36. The retention arms 36 are engageable against the panel 18 to retain the grommet assembly 20 and the panel 18 together. The retention arms 36 can be cantilevered extensions of the structural portions 70. For example, slots 40 can extend through the structural portions 70 along each side of the retention arms 36. The sealing portion 72 can span the slots 40 to aid in sealing the grommet assembly 20 without hindering or delaying the functionality of the retention tabs 36 (see FIG. 7B). As seen in FIG. 2B, a recess 58 can be formed in the sealing portion 72 spanning each slot 40.

Figure 4:
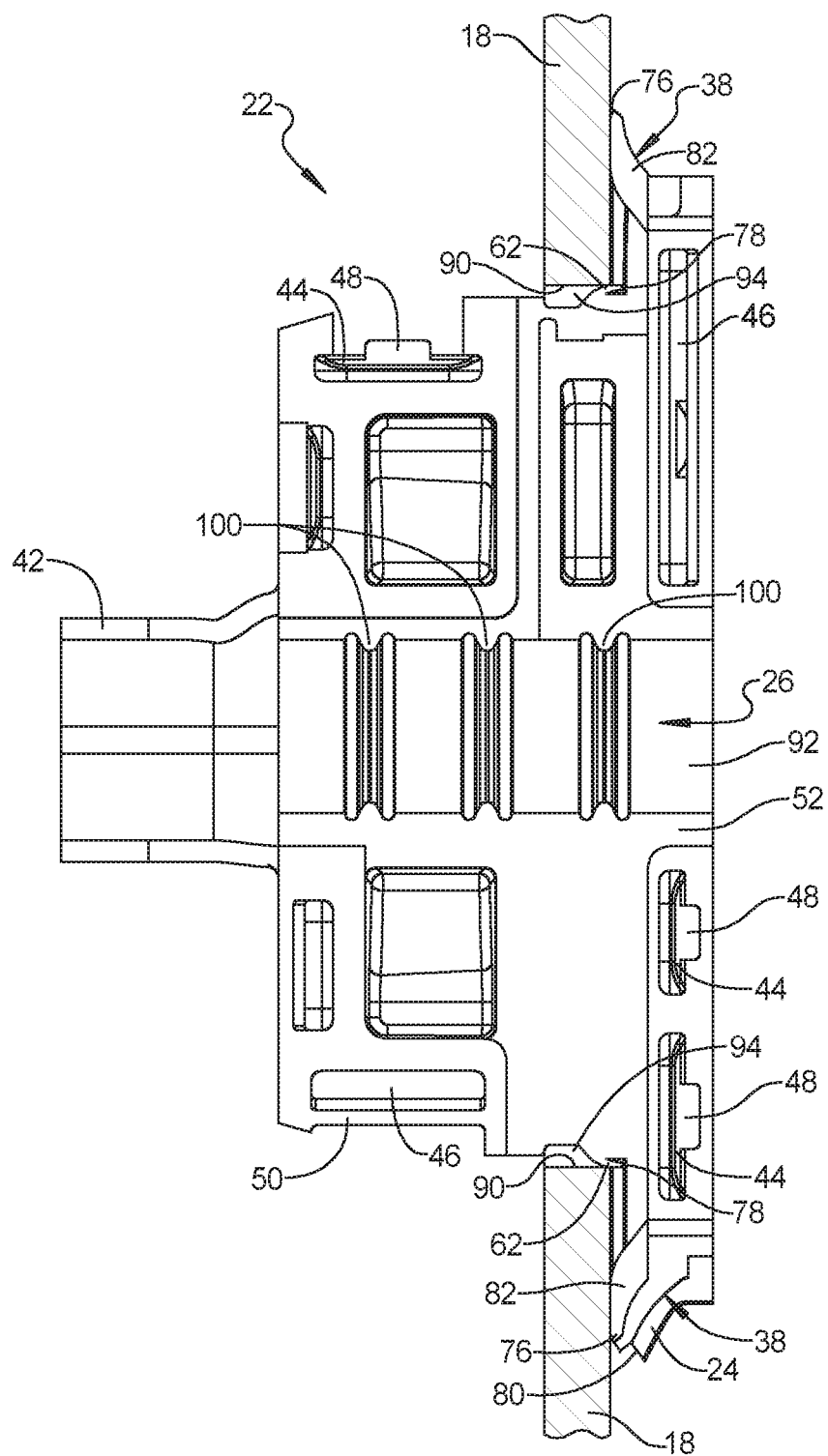
FIG. 4 is an elevation view of one of the rotationally symmetrical components of FIGS. 1A and 1B centered within an opening of a panel in a partial cross-section view.
Figure 5:
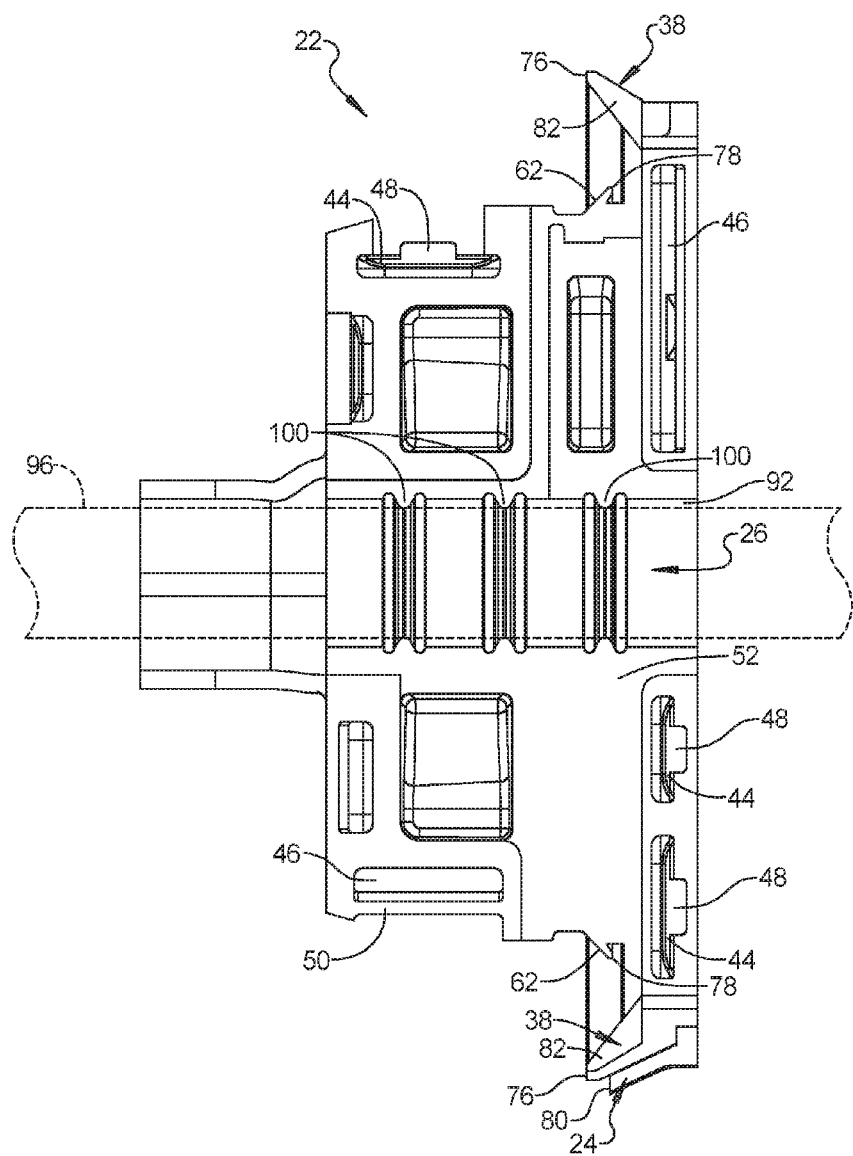
FIG. 5 is a planar view of one of the rotationally symmetrical components of FIGS. 1A and 1B supporting a wiring harness passing therethrough.

As seen in FIG. 4, the sealing portions 72 form an outer sealing lip or rim 38. The outer sealing lip 38 an outer lip distal edge 76 that is engageable against a surface of the panel 18 adjacent the opening 94, as seen in FIG. 4, to retain the grommet assembly 20 and the panel 18 together and to provide a first circumferential or annular seal providing dust, dirt, and fluid resistance. The sealing portion 72 can also have an inner sealing lip 62 including an inner lip distal edge 78. As seen in FIG. 4, the inner lip distal edge 78 can be engaged against a side edge 90 of the opening 94 of the panel 18 and provide a second circumferential or annular seal providing dust, dirt, and fluid resistance. As seen in FIG. 5, prior to the engagement of the grommet assembly 20 and the panel 18, the outer sealing lip 38 can be angled downwardly and outwardly in a first direction, and the inner sealing lip 62 can be angled upwardly and outwardly in a second direction opposite the first direction. In the illustrated embodiment "downwardly" corresponds to the direction of insertion; that is, the direction that the grommet assembly 20 is inserted into the opening 94 of the panel 18. Thus, "upwardly" corresponds to the direction that is opposite the direction of insertion.

The outer sealing lip 38 further includes lap joints 68 that are adjacent opposite sides of the primary coupling faces 52. Each lap joint 68 of the outer sealing lip 38 can include a plurality of cooperating mating terminal surfaces 82. The cooperating mating terminal surfaces 82 can extend in an angled plane that is neither parallel nor perpendicular to a plane defined by the primary coupling face 52. The lap joint 68 can include additional overlapping, engaging, mating or cooperating surfaces 83.

Figure 1B:
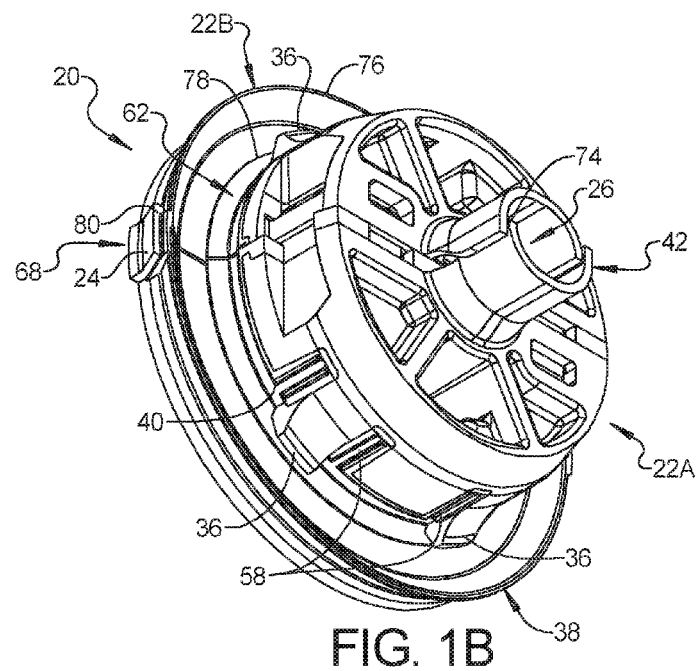
Figure 6:
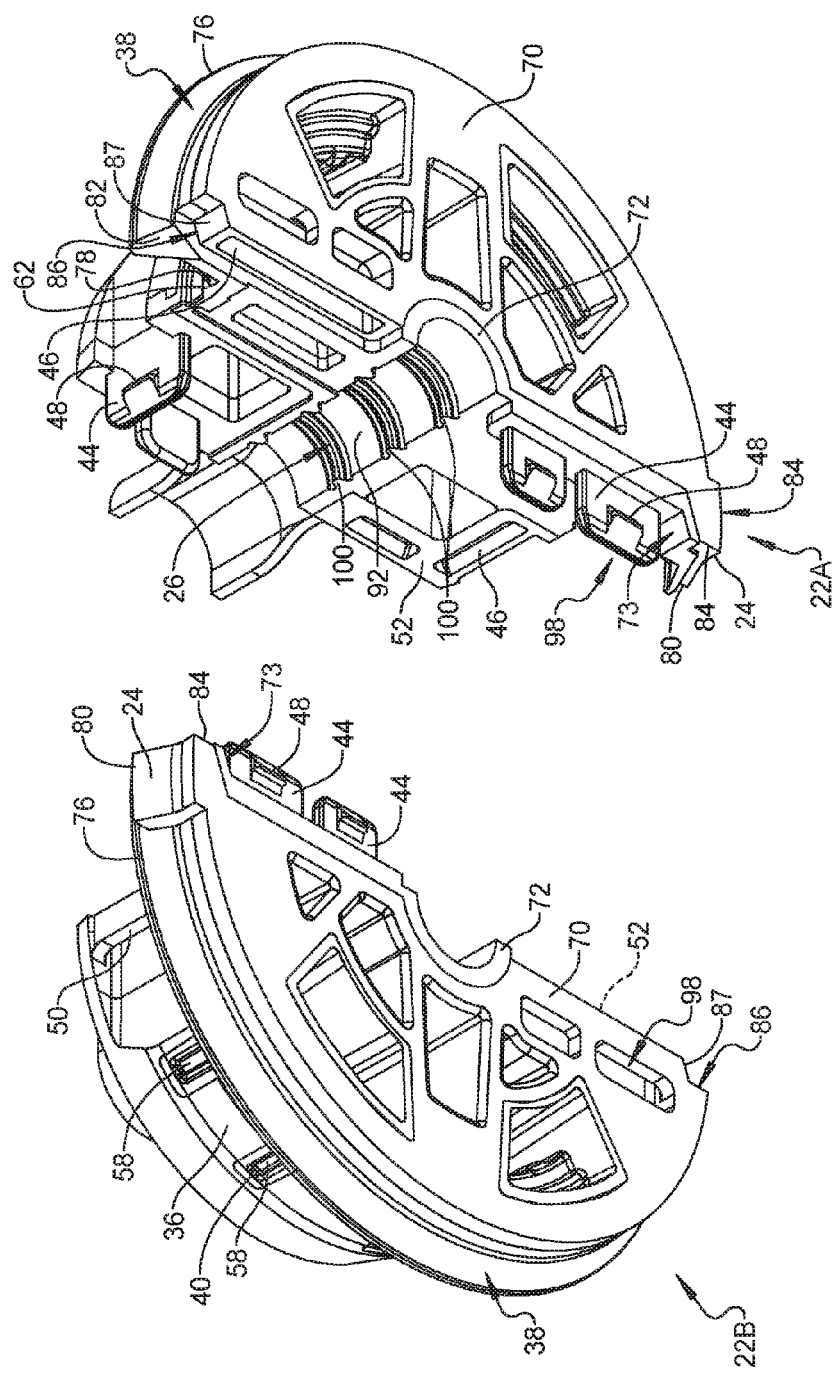
FIG. 6 is an exploded perspective view of the rotationally symmetrical components of FIGS. 1A and 1B.

As seen in FIG. 6, the structural portions 70 include outer reinforcement tabs 24 that will extend over each lap joint 68 of the outer sealing lip 38 when the rotationally symmetrical components 22A and 22B are coupled (see FIGS. 1A and 1B). The reinforcement tabs 24 are designed to resist separation of the lap joints 68 including separation of each cooperating surface pairs 82 and 83 of the sealing portion 72. The reinforcement tabs 24 can include a reinforcement tab distal edge 80 that is spaced upwardly from the outer lip distal edge 76. For example, in some instances, the distal edge 80 of the reinforcement tab 24 is spaced upwardly from the distal edge 76 of the lip 76 a distance that is from about 10% to about 90% of the height of the outer seal lip 38. In some instances, the distal edge 80 of the reinforcement tab 24 is spaced upwardly from the distal edge 76 of the lip 76 a distance that is from about 10% to about 50% of the height of the outer seal lip 38. In some instances, the distal edge 80 of the reinforcement tab 24 is spaced upwardly from the distal edge 76 of the lip 76 a distance that is from about 75% to about 90% of the height of the outer seal lip 38. The reinforcement tab distal edge 80 can also be spaced from the upper surface of the panel 18 when the grommet assembly 20 is mounted to the panel 18, while the distal edge 76 of outer seal lip 38 engages against the upper surface of the panel 18.

Figure 7A:
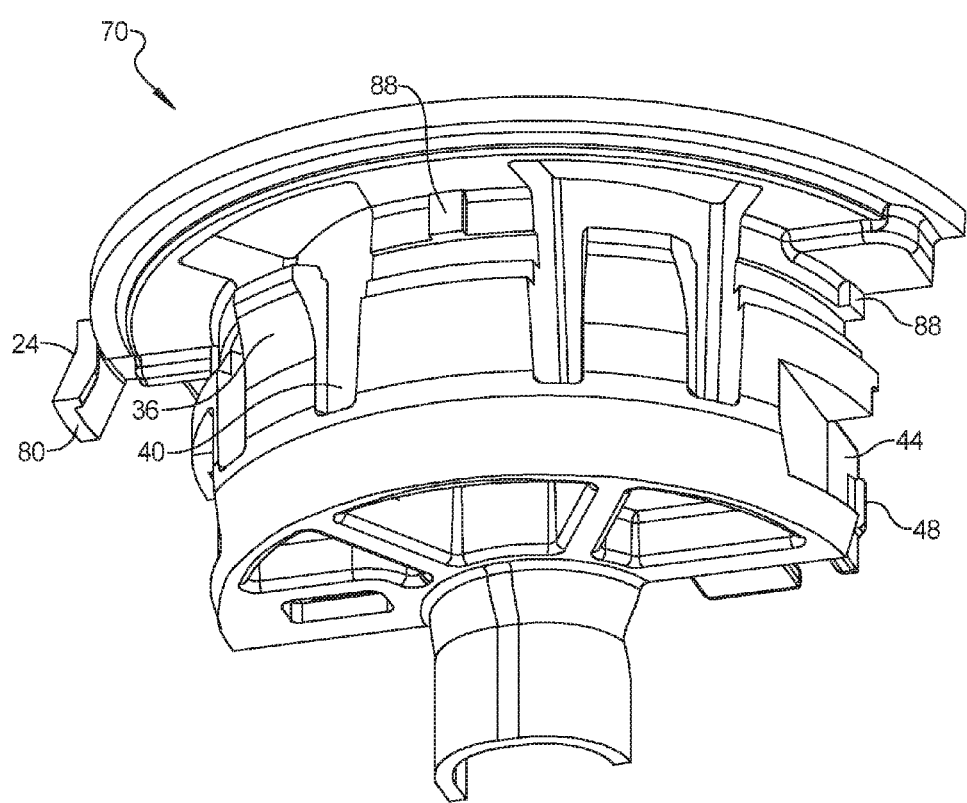
FIG. 7A is a perspective view of the structural portion of one of the rotationally symmetrical components of FIGS. 1A and 1B.
Figure 7B:
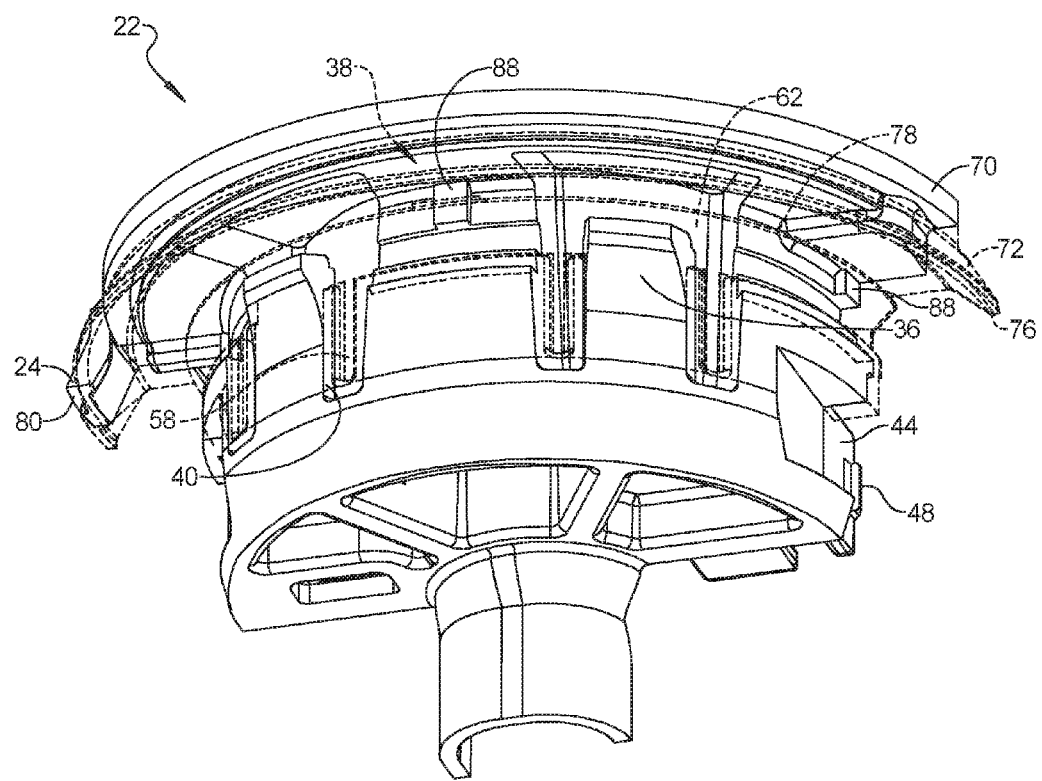
FIG. 7B is a perspective view of the structural portion similar to FIG. 7A, but with the sealing portion added in phantom.

The reinforcement tabs 24 can further include a projection or extension 84 that extends past the plane defined by the primary coupling face 52, and a corresponding recess 86 that is short of the plane defined by the primary coupling face 52. The extension 84 is receivable by a corresponding recess 86 with the sealing portion 72 extending therebetween. Cooperating mating surfaces 87 of the extension 84 and recess 86 and associated portions 73 of the sealing portion 72 can extend in an angled plane that is neither parallel nor perpendicular to the plane defined by the primary coupling face 52. Thus, the associated portions 73 of the sealing portions 72 and at least one of the extension 84 and the recess 86 can include the cooperating mating surfaces extending in an angled plane that is neither parallel nor perpendicular to the plane As seen in FIG. 7A, the structural portions 70 can include a plurality of centering rib protrusions 88. The centering rib protrusions 88 are positionable adjacent a side edge 90 of the opening 94 of the panel 18 when inserted therein. The sealing portions 72 of the integrated components 22A, 22B can extend over the centering rib protrusions 88, as seen in FIG. 7B. The centering rib protrusions 88 can help center the grommet assembly 20 with the opening 94 of the panel 18. Further, the centering rib protrusions 88 can help the retention arms 36 better retain the grommet assembly 20 within the opening 94 and the distal edge 78 of the inner sealing lip 62 against the side edge 90 of the opening 94.

Figure 8A:
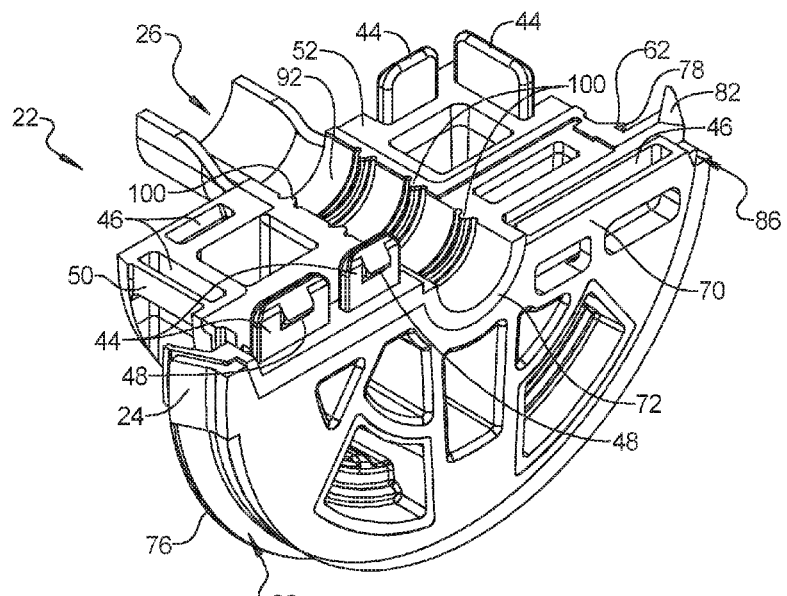
FIGS. 8A and 8B are perspective views of one of the rotationally symmetrical components of FIGS. 1A and 1B.
Figure 8B:
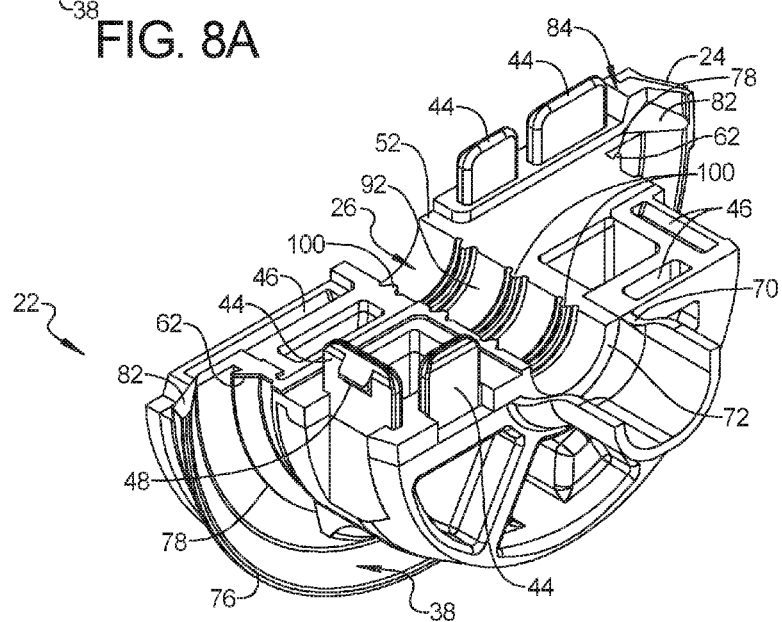

As seen in FIGS. 8A and 8B, the sealing portion 72 can form a resilient surface 92 of the harness-receiving passage 26 that is engageable against the wiring harness 96 extending therethrough. As in the illustrated example, the resilient surface 92 can include one or more annular protrusions 100 that each provide a circumferential or annular circumferential or annular seal providing dust, dirt, and fluid resistance.

The rotationally symmetrical components 22A and 22B can be formed using a two-shot molding process. The structural portion 70 can be form in a first shot operation of the two-shot molding process. The sealing portion 72 can be integrally formed with the structural portion in a second shot operation of the two-shot molding process. The symmetrical nature of the components 22A and 22B allows both of the rotationally symmetrical components 22A and 22B to be formed by the same mold set.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A grommet assembly to support a wiring harness passing through an opening in a panel, the grommet assembly comprising: two rotationally symmetrical components coupled together along a primary coupling face to form a harness-receiving passage therethrough, each of the two rotationally Symmetrical components being an integrated component comprising a first, thermoplastic structural portion integrated with a second, resilient second, sealing portion; the first, structural portions of the integrated components including a plurality of interlocking elements cooperating to couple the components together, and a plurality of retention arms engageable against the panel to retain the grommet assembly and the panel together; the second, sealing portions of the integrated components forming an outer sealing lip having a lip distal edge engageable against a surface of the panel adjacent the opening, the outer sealing lip comprising a pair of lap joints, each of the pair of lap joints being adjacent a respective opposite side of the primary coupling faces; and the first, structural portions of the integrated components further including a pair of outer reinforcement tabs, each of the pair of outer reinforcing tabs extending over one of the pair joints and designed to resist separation of the one of the pair lap joints of the outer sealing lip of the second, sealing portion.

2. The grommet assembly of claim 1, wherein the outer reinforcement tabs of the first, structural portions of the integrated components comprise a reinforcement tab distal edge that is spaced from the lip distal edge of the outer sealing lip of the second, sealing portions, and that is spaced from the surface of the panel when the grommet assembly is mounted to the panel.

3. The grommet assembly of claim 1, wherein each of the pair of lap joints of the outer sealing lip of the second, sealing portions of the integrated components includes cooperating mating terminal surfaces extending in an angled plane that is neither parallel nor perpendicular to a plane defined by the primary coupling face.

4. The grommet assembly of claim 1, wherein the reinforcement tabs of the first, structural portions of the integrated components further comprise an extension extending past a plane defined by the primary coupling face that is received within a corresponding recess short of the plane with the second, sealing portion extending therebetween, the second, sealing portion and at least one of the extension and the corresponding recess including cooperating mating surfaces extending in an angled plane that is neither parallel nor perpendicular to the plane.

5. The grommet assembly of claim 1, wherein a slot through the first, structural portions of the integrated components extends along each side of the retention arms with the second, sealing portion spanning each slot, and wherein a recess is formed in the second, sealing portion spanning each slot.

6. The grommet assembly of claim 1, wherein the first, structural portions of the integrated components further include a plurality of centering rib protrusions positionable adjacent a side edge of the opening of the panel to help the retention arms better retain the grommet assembly centrally within the opening.

7. The grommet assembly of claim 6, wherein the second, sealing portions of the integrated components extend over the centering rib protrusions.

8. The grommet assembly of claim 1, wherein the first, structural and second, sealing portions of each of the two rotationally symmetrical components are integrated with each other along substantially all contacting surfaces thereof.

9. The grommet assembly of claim 1, wherein the second, sealing portions of the integrated components form a surface of the harness-receiving passage engageable against the wiring harness extending therethrough.

10. The grommet assembly of claim 1, wherein the primary coupling face comprises staggered parallel surfaces.

11. The grommet assembly of claim 1, wherein the interlocking elements of the first, structural portions of the integrated components comprise extending tabs engageable with receiving pockets.

12. The grommet assembly of claim 1, wherein the first and second rotationally symmetrical components are both formable by the same mold set.

13. A process of molding the grommet assembly of claim 1, comprising forming the first, structural portion of each rotationally symmetrical component in a first shot operation of a two-shot molding process and integrally forming the second, sealing portion with the first, structural portion formed during the first shot operation in a second shot operation of the two-shot molding process.

14. A grommet assembly to support a wiring harness passing through an opening in a panel, the grommet assembly comprising:
   two rotationally symmetrical components coupled together along a primary coupling face to form a harness-receiving passage therethrough, each of the two rotationally symmetrical components being an integrated component comprising a first, thermoplastic structural portion integrated with a second, resilient sealing portion;
   the first, structural portions of the integrated components including a plurality of interlocking elements cooperating to couple the components together, and a plurality of retention arms engageable against the panel to retain the grommet assembly and the panel together; and
   the second, sealing portions of the integrated components forming an outer sealing lip having an outer lip distal edge engageable against a surface of the panel adjacent the opening and an inner sealing lip engageable against a side edge of the opening of the panel, the outer sealing lip comprising a pair of lap joints, each of the pair of lap joints being adjacent a respective opposite side of the primary coupling faces.

15. The grommet assembly of claim 14, wherein the outer lip distal edge of the second, sealing portions of the integrated components is angled outwardly in a first direction and the inner sealing lip of the second, sealing portions of the integrated component is angled outwardly in a second direction opposite the first direction.

16. The grommet assembly of claim 14, wherein the first, structural portions of the integrated components include a plurality of centering rib protrusions positionable adjacent the side edge with the inner sealing lip therebetween to help retain the grommet centrally in the opening and maintain the inner sealing lip against the side edge of the opening.

17. The grommet assembly of claim 16, wherein the second, sealing portions of the integrated components extend over the centering rib protrusions between the centering rib protrusions and the inner sealing lip.

18. The grommet assembly of claim 14, wherein the first, structural portions of the integrated components further include a pair of outer reinforcement tabs, each of the pair of outer reinforcing tabs extending over one of the pair of lap joints and designed to resist separation of the one of the pair of lap joints of the outer sealing lip of the second, sealing portions of the integrated components, the outer reinforcement tabs comprising a reinforcement tab distal edge that is spaced from the outer lip distal edge of the outer sealing lip of the second, sealing portions of the integrated components and spaced from the surface of the panel when the grommet assembly is mounted to the panel.

19. The grommet assembly of claim 18, wherein the reinforcement tabs of the first, structural portions further comprise an extension extending past a plane defined by the primary coupling face that is received within a corresponding recess short of the plane with the second, sealing portion extending therebetween, the second, sealing portion and at least one of the extension and the recess including cooperating mating surfaces extending in an angled plane that is neither parallel nor perpendicular to the plane.

20. The grommet assembly of claim 14, wherein a slot through the first, structural portions of the integrated components extends along each side of the retention arms with the second, sealing portion spanning each slot, and wherein a recess is formed in the second, sealing portion spanning each slot.

* * * * *

UNITED STATES PATENT AND TRADEMARK OFFICE
CERTIFICATE OF CORRECTION

PATENT NO.        : 9,944,239 B1
APPLICATION NO.   : 15/600159
DATED             : April 17, 2018
INVENTOR(S)       : Tien T. Diep et al.

Page 1 of 1

It is certified that error appears in the above-identified patent and that said Letters Patent is hereby corrected as shown below:

In the Claims

| | | |
|---|---|---|
| Column 6, | Line 17 | In Claim 1, after "comprising:", insert --¶-- |
| Column 6, | Line 20 | In Claim 1, delete "Symmetrical" and insert --symmetrical-- therefor |
| Column 6, | Line 23 | In Claim 1, after "portion;", insert --¶-- |
| Column 6, | Line 27 | In Claim 1, after "together;", insert --¶-- |
| Column 6, | Line 33 | In Claim 1, after "and", insert --¶-- |

Signed and Sealed this
Seventeenth Day of July, 2018

Andrei Iancu
*Director of the United States Patent and Trademark Office*